(12) United States Patent
Tse et al.

(10) Patent No.: US 9,953,679 B1
(45) Date of Patent: Apr. 24, 2018

(54) SYSTEMS AND METHODS FOR GENERATING A TIME LAPSE VIDEO

(71) Applicant: GOPRO, INC., San Mateo, CA (US)

(72) Inventors: Daniel Tse, San Mateo, CA (US); Desmond Chik, Mountain View, CA (US); Jonathan Wills, San Mateo, CA (US); Mahlet Getachew, Mountain View, CA (US); Rajvikram Singh, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/163,637

(22) Filed: May 24, 2016

(51) Int. Cl.
*G11B 27/031* (2006.01)
*G11B 27/00* (2006.01)
(Continued)

(52) U.S. Cl.
CPC ........ *G11B 27/031* (2013.01); *G06K 9/00718* (2013.01); *G06K 9/00744* (2013.01);
(Continued)

(58) Field of Classification Search
CPC ... G11B 27/105; G11B 27/329; G11B 27/034; H04N 5/85; H04N 9/8042
(Continued)

(56) References Cited

U.S. PATENT DOCUMENTS 6,633,685 B1 10/2003 Kusama
7,512,886 B1 3/2009 Herberger et al.
(Continued)

FOREIGN PATENT DOCUMENTS

JP H09181966 A 7/1997
JP 2005252459 A 9/2005
(Continued)

OTHER PUBLICATIONS

Nicole Lee, Twitter's Periscope is the best livestreaming video app yet; Mar. 26, 2015 URL:http://www.engadget.com/2015/03/26/periscope/ [Retrieved Aug. 25, 2015] 11 pages.
(Continued)

*Primary Examiner* — William C Vaughn, Jr.
*Assistant Examiner* — Daniel Tekle
(74) *Attorney, Agent, or Firm* — Sheppard Mullin Richter & Hampton LLP

(57) ABSTRACT

Images may be extracted from a video. The images may be grouped into image groups. Numbers and types of classified visuals within the images may be detected. Individual types of classified visuals may correspond to individual classification weights. Image classification weights for the images may be determined based on the numbers and the types of classified visuals and the individual classification weights. Interest weights for the images may be determined based on the image classification weights and the sizes of the image groups to which the individual images belong. An interest curve may be generated based on the interest weights. A retime curve may be generated based on the interest curve. Time lapse images to be included in the time lapse video may be determined based on the images and the retime curve. The time lapse video may be generated based on the time lapse images.

16 Claims, 10 Drawing Sheets

(51) Int. Cl.
*G11B 27/30* (2006.01)
*G06K 9/00* (2006.01)
*H04N 5/262* (2006.01)

(52) U.S. Cl.
CPC ........ *G11B 27/002* (2013.01); *G11B 27/3027* (2013.01); *G11B 27/3081* (2013.01); *H04N 5/262* (2013.01)

(58) Field of Classification Search
USPC ........................................................ 386/241
See application file for complete search history.

(56) References Cited

U.S. PATENT DOCUMENTS

| | | | |
|---|---|---|---|
| 7,885,426 B2 | 2/2011 | Golovchinsky | |
| 7,970,240 B1 | 6/2011 | Chao | |
| 8,180,161 B2 | 5/2012 | Haseyama | |
| 8,606,073 B2 | 12/2013 | Woodman | |
| 8,774,560 B2 | 7/2014 | Sugaya | |
| 8,971,623 B2 | 3/2015 | Gatt | |
| 8,990,328 B1 | 3/2015 | Grigsby | |
| 9,041,727 B2 | 5/2015 | Ubillos | |
| 9,142,257 B2 | 9/2015 | Woodman | |
| 9,342,376 B2 | 5/2016 | Jain | |
| 9,418,283 B1 | 8/2016 | Natarajan | |
| 2002/0165721 A1 | 11/2002 | Chang | |
| 2004/0001706 A1 | 1/2004 | Jung | |
| 2005/0025454 A1 | 2/2005 | Nakamura | |
| 2005/0108031 A1 | 5/2005 | Grosvenor | |
| 2005/0198018 A1 | 9/2005 | Shibata | |
| 2006/0080286 A1 | 4/2006 | Svendsen | |
| 2006/0115108 A1 | 6/2006 | Rodriguez | |
| 2008/0123976 A1 | 5/2008 | Coombs | |
| 2008/0183843 A1 | 7/2008 | Gavin | |
| 2009/0019995 A1 | 1/2009 | Miyajima | |
| 2009/0027499 A1 | 1/2009 | Nicholl | |
| 2009/0043157 A1* | 2/2009 | Hirakawa | A61B 1/00045 600/109 |
| 2009/0125559 A1 | 5/2009 | Yoshino | |
| 2009/0252474 A1 | 10/2009 | Nashida | |
| 2010/0046842 A1 | 2/2010 | Conwell | |
| 2010/0086216 A1 | 4/2010 | Lee | |
| 2010/0161720 A1 | 6/2010 | Colligan | |
| 2010/0199182 A1 | 8/2010 | Lanza | |
| 2010/0274714 A1 | 10/2010 | Sims | |
| 2010/0318660 A1 | 12/2010 | Balsubramanian | |
| 2011/0103700 A1 | 5/2011 | Haseyama | |
| 2011/0137156 A1 | 6/2011 | Razzaque | |
| 2011/0170086 A1 | 7/2011 | Oouchida | |
| 2011/0206351 A1 | 8/2011 | Givoly | |
| 2011/0242098 A1 | 10/2011 | Tamaru | |
| 2012/0014673 A1 | 1/2012 | O'Dwyer | |
| 2012/0027381 A1 | 2/2012 | Kataoka | |
| 2012/0030263 A1 | 2/2012 | John | |
| 2012/0141019 A1 | 6/2012 | Zhang | |
| 2012/0210205 A1 | 8/2012 | Sherwood | |
| 2012/0210228 A1 | 8/2012 | Wang | |
| 2012/0246114 A1 | 9/2012 | Edmiston | |
| 2012/0283574 A1 | 11/2012 | Park | |
| 2013/0182166 A1 | 7/2013 | Shimokawa | |
| 2013/0235071 A1 | 9/2013 | Ubillos | |
| 2013/0239051 A1 | 9/2013 | Albouze | |
| 2013/0330019 A1 | 12/2013 | Kim | |
| 2014/0149865 A1 | 5/2014 | Tanaka | |
| 2014/0152762 A1 | 6/2014 | Ukil | |
| 2014/0282661 A1 | 9/2014 | Martin | |
| 2015/0039646 A1 | 2/2015 | Sharifi | |
| 2015/0071547 A1 | 3/2015 | Keating | |
| 2015/0113009 A1 | 4/2015 | Zhou | |
| 2015/0156247 A1 | 6/2015 | Hensel | |
| 2015/0287435 A1 | 10/2015 | Land | |
| 2016/0029105 A1 | 1/2016 | Newman | |
| 2016/0094601 A1 | 3/2016 | Besehanic | |
| 2016/0103830 A1 | 4/2016 | Cheong | |
| 2016/0189752 A1 | 6/2016 | Galant | |
| 2016/0260000 A1 | 9/2016 | Yamakawa | |
| 2016/0286235 A1 | 9/2016 | Yamamoto | |

FOREIGN PATENT DOCUMENTS

| | | |
|---|---|---|
| JP | 2006053694 | 2/2006 |
| JP | 2006053694 A | 2/2006 |
| JP | 2008059121 A | 3/2008 |
| JP | 2009053748 A | 3/2009 |
| JP | 2011188004 | 9/2011 |
| JP | 2011188004 A | 9/2011 |
| WO | 2006001361 A1 | 1/2006 |
| WO | 2009040538 | 4/2009 |
| WO | 2012057623 | 5/2012 |
| WO | 2012057623 A1 | 5/2012 |
| WO | 2012086120 A1 | 6/2012 |

OTHER PUBLICATIONS

Japanese Office Action for JP Application No. 2013-140131, dated Aug. 5, 2014, 6 pages.
Office Action for U.S. Appl. No. 13/831,124, dated Mar. 19, 2015, 14 pages.
PSonar URL: http://www.psonar.com/about retrieved on Aug. 24, 2016, 3 pages.
PCT International Search Report and Written Opinion for PCT/US2015/023680, dated Oct. 6, 2015, 13 pages.
PCT International Written Opinion for PCT/US2015/041624, dated Dec. 17, 2015, 7 Pages.
PCT International Search Report for PCT/US15/41624 dated Nov. 4, 2015, 5 pages.
PCT International Search Report for PCT/US15/23680 dated Aug. 3, 2015, 4 pages.
PCT International Preliminary Report on Patentability for PCT/US2015/023680, dated Oct. 4, 2016, 10 pages.
FFmpeg, "Demuxing," Doxygen, Dec. 5, 2014, 15 Pages, [online] [retrieved on Jul. 13, 2015] Retrieved from the Internet <URL:https://www.ffmpeg.org/doxygen/2.3/group_lavf_encoding_html>.
PCT International Search Report and Written Opinion for PCT/US15/12086 dated Mar. 17, 2016, 20 pages.
FFmpeg, "Muxing," Doxygen, Jul. 20, 2014, 9 Pages, [online] [retrieved on Jul. 13, 2015] Retrieved from the internet <URL: https://www.ffmpeg.org/doxyg en/2. 3/structA VP a ck et. html>.
Iandola et al., "SqueezeNet: AlexNet-level accuracy with 50x fewer parameters and <0.5MB model size", arXiv:1602.07360v3 [cs.CV] Apr. 6, 2016 (9 pgs.).
Yang et al., "Unsupervised Extraction of Video Highlights Via Robust Recurrent Auto-encoders" arXiv:1510.01442v1 [cs.CV] Oct. 6, 2015 (9 pgs).
Tran et al., "Learning Spatiotemporal Features with 3D Convolutional Networks", arXiv:1412.0767 [cs.CV] Dec. 2, 2014 (9 pgs).
Schroff et al., "FaceNet: A Unified Embedding for Face Recognition and Clustering," IEEE Conference on Computer Vision and Pattern Recognition (CVPR), 2016, 10 pgs.
Parkhi et al., "Deep Face Recognition," Proceedings of the British Machine Vision, 2015, 12 pgs.
Iandola et al., "SqueezeNet: AlexNet-level accuracy with 50x fewer parameters and <0.5MB model size," arXiv:1602.07360, 2016, 9 pgs.
Ioffe et al., "Batch Normalization: Accelerating Deep Network Training by Reducing Internal Covariate Shift," arXiv:1502.03167, 2015, 11 pgs.
He et al., "Deep Residual Learning for Image Recognition," arXiv:1512.03385, 2015, 12 pgs.
Han et al., Deep Compression: Compressing Deep Neural Networks with Pruning, Trained Quantization and Huffman Coding, International Conference on Learning Representations 2016, 14 pgs.

* cited by examiner

240 Images Per Segment

SYSTEMS AND METHODS FOR GENERATING A TIME LAPSE VIDEO

FIELD

This disclosure relates to systems and methods that generate a time lapse video.

BACKGROUND

Video applications may allow a user to manually change speeds with which a video is displayed on playback. Manually changing speeds for a video may be time consuming and may discourage users from changing speeds for the video/viewing the entire video.

SUMMARY

This disclosure relates to generating a time lapse video. A video may be accessed. Images may be extracted from the video. The images may be grouped into image groups. Individual image groups may have sizes defined by numbers of images in the individual image groups. Individual image groups may include similar and sequential images. Numbers and types of classified visuals within the images may be detected. Individual types of classified visuals may correspond to individual classification weights. Image classification weights for the images may be determined based on the numbers and the types of classified visuals and the individual classification weights. Interest weights for the images may be determined based on the image classification weights and the sizes of the image groups to which the individual images belong. An interest curve may be generated based on the interest weights. A retime curve may be generated based on the interest curve. Time lapse images to be included in the time lapse video may be determined based on the images and the retime curve. The time lapse video may be generated based on the time lapse images.

A system that generates a time lapse video may include one or more physical processors, and/or other components. The one or more physical processors may be configured by machine-readable instructions. Executing the machine-readable instructions may cause the one or more physical processors to facilitate generating a time lapse video. The machine-readable instructions may include one or more computer program components. The computer program components may include one or more of an access component, an extract component, a group component, a detect component, an image weight component, an interest weight component, an interest curve component, a retime component, a time lapse image component, a time lapse video component, and/or other computer program components.

The access component may be configured to access one or more videos and/or other information. The access component may access one or more videos and/or other information stored in electronic storage and/or in other locations. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

The extract component may be configured to extract one or more images from one or more videos. In some implementations, one or more videos may be characterized by one or more encoded framerates. One or more images may be extracted from one or more videos at one or more encoded framerates. In some implementations, the extract component may be configured to downsample one or more images. In some implementations, the extract component may be configured to stabilize one or more images. One or more images may be stabilized based on a feature point detection and/or other information.

The group component may be configured to group one or more images into image groups. Individual image groups may have individual sizes defined by numbers of images in the individual image groups. Individual image groups may include similar and sequential images. For example, a first image group may have a first size. The first image group may include a first image, a second image, and/or other images. The first image may be similar to the second image and/or other images. The first image may be sequential with the second image and/or other images.

In some implementations, grouping one or more images into image groups may include determining image similarity based on comparisons of feature vectors of sequential pairs of the individual images, and/or other information. Feature vectors may include a first feature vector characterizing a local binary pattern distribution of the individual images, a second feature vector characterizing a color distribution of the individual images, and/or other feature vectors.

The detect component may be configured to detect numbers and types of classified visuals within one or more images. Individual types of classified visuals may correspond to individual classification weights. For example, a first number of a first type of classified visual within the first image may be detected. The first type of classified visual may correspond to a first classification weight. In some implementations, the numbers and the types of classified visuals within one or more images may be detected based on a convolutional neural network based scene and/or object classifier, and/or other information.

The image weight component may be configured to determine one or more image classification weights for one or more images. Image classification weights may be determined based on the numbers and the types of classified visuals detected within the individual images, the individual classification weights, and/or other information. For example, a first image classification weight may be determined for the first image based on the first number of the first type of classified visual and the first classification weight.

The interest weight component may be configured to determine interest weights for one or more images. Interest weights may be determined based on the image classification weights for the individual images, the sizes of the image groups to which the individual images belong, and/or other information. For example, a first interest weight may be determined for the first image based on the first image classification weight and the first size. In some implementations, an inverse relationship may exist between interest weights for one or more images and sizes of the image groups to which the individual images belong.

The interest curve component may be configured to generate an interest curve for one or more images. An interest curve may be generated based on one or more interest weights and/or other information. For example, an interest curve may be generated such that a value of the interest curve at a point corresponding to the first image may be based on the first interest weight.

The retime component may be configured to generate a retime curve for one or more images. A retime curve may be generated based on an interest curve and/or other information. A retime curve may define perceived speeds at which a time lapse video is displayed during playback. For example, a retime curve may define a first perceived speed at which a portion of a time lapse video corresponding to the first image is displayed during playback.

The time lapse image component may be configured to determine one or more time lapse images to be included in a time lapse video. One or more time lapse images may be determined based on one or more images, a retime curve, and/or other information. In some implementations, determining one or more time lapse images to be included in a time lapse video may include modifying at least some of the images to include motion blur based on the interest curve and/or other information. In some implementations, modifying at least some of the images to include motion blur may include determining per pixel flow fields for at least some of the images and applying a line integral convolution based on the per pixel flow fields and/or other information.

The time lapse video component may be configured to generate one or more time lapse videos. One or more time lapse video may be generated based on one or more time lapse images and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
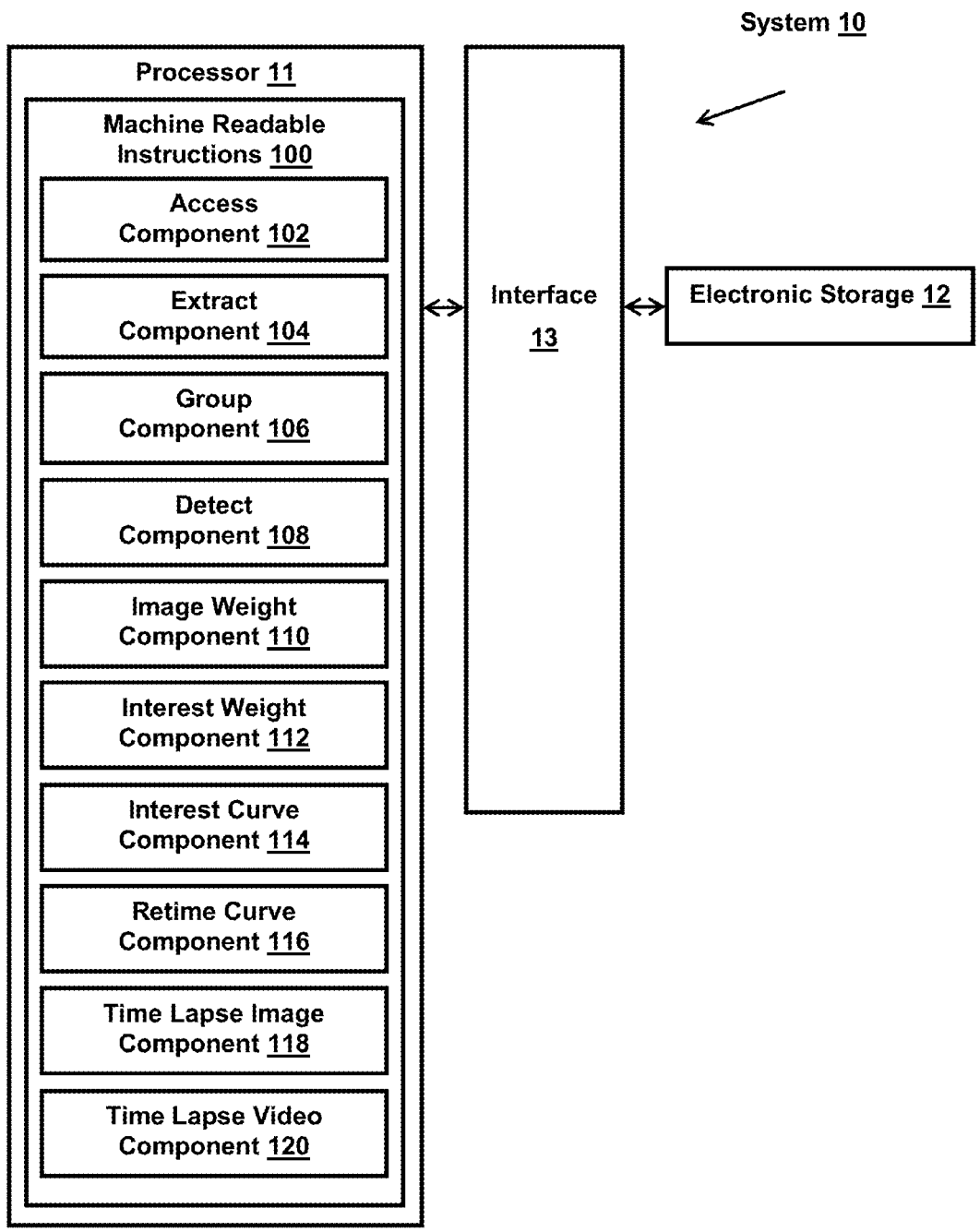
FIG. 1 illustrates a system for generating a time lapse video.

FIG. 1 illustrates system 10 for generates a time lapse video. System 10 may include one or more of processor 11, electronic storage 12, interface 13 (e.g., bus, wireless interface, etc.), and/or other components. A video may be accessed by processor 11. Images may be extracted from the video. The images may be grouped into image groups. Individual image groups may have sizes defined by numbers of images in the individual image groups. Individual image groups may include similar and sequential images. Numbers and types of classified visuals within the images may be detected. Individual types of classified visuals may correspond to individual classification weights. Image classification weights for the images may be determined based on the numbers and the types of classified visuals and the individual classification weights. Interest weights for the images may be determined based on the image classification weights and the sizes of the image groups to which the individual images belong. An interest curve may be generated based on the interest weights. A retime curve may be generated based on the interest curve. Time lapse images to be included in the time lapse video may be determined based on the images and the retime curve. The time lapse video may be generated based on the time lapse images.

Electronic storage 12 may include electronic storage medium that electronically stores information. Electronic storage 12 may store software algorithms, information determined by processor 11, information received remotely, and/or other information that enables system 10 to function properly. For example, electronic storage 12 may store information relating to videos, images, extracting images, image groups, image group sizes, classified visuals, types of classified visuals, classification weights, image classification weights, interest weights, interest curves, retime curves, time lapse images, time lapse videos, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generating a time lapse video. Machine-readable instructions 100 may include one or more computer program components. Machine readable instructions 100 may include one or more of access component 102, extract component 104, group component 106, detect component 108, image weight component 110, interest weight component 112, interest curve component 114, retime component 116, time lapse image component 118, time lapse video component 120, and/or other computer program components.

Access component 102 may be configured to access one or more videos and/or other information. A video may include a video clip captured by a video capture device, multiple video clips captured by a video capture device, and/or multiple video clips captured by separate video capture devices. A video may include multiple video clips captured at the same time and/or multiple video clips captured at different times. A video may include a video clip processed by a video application, multiple video clips processed by a video application and/or multiple video clips processed by separate video applications.

Access component 102 may access one or more videos and/or other information stored in electronic storage (e.g., electronic storage 12, etc.) and/or in other locations. Access component 102 may be configured to access one or more videos and/or other information during acquisition of the video or after acquisition of the video. For example, access component 102 may access a video while the video is being captured by one or more cameras/image sensors. Access component 102 may obtain a video after the video has been captured and stored in memory (e.g., electronic storage 12, etc.). In some implementations, one or more videos may be characterized by one or more encoded framerates. An encoded framerate may define a number of images/frames within a video per a time duration (e.g., number of images/frames per second, etc.).

Figure 3:
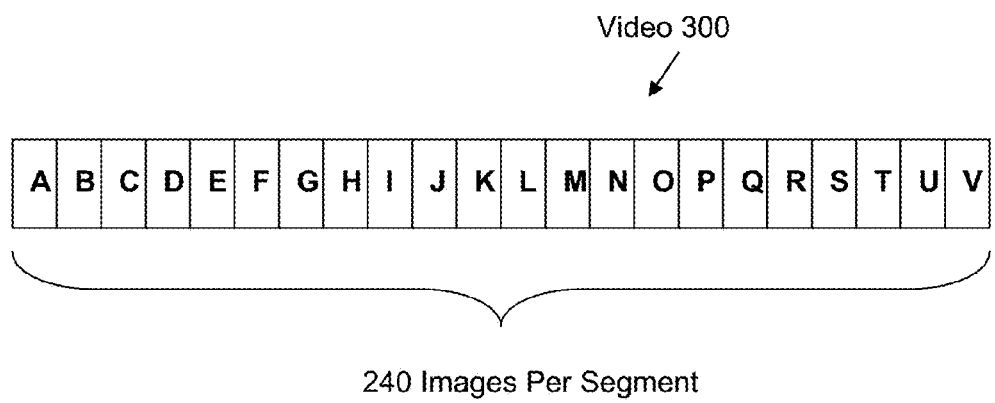
FIG. 3 illustrates an example of video segments within a video.

For example, FIG. 3 illustrates video 300 accessed by access component 102. Video 300 may have been captured with an encoded framerate of 240 frames (images) per second. For ease of reference, video 300 is shown divided into video segments A-V in FIG. 3. Video segments A-V may individually represent one-second capture of video 300 at the encoded framerate of 240 frames (images) per second. Individual video segments A-V may include 240 frames (images).

Extract component 104 may be configured to extract one or more images from one or more videos. For example, extract component 104 may extract one or more I-frames from video 300. Extract component 104 may extract one or more of other frames (e.g., P-frames, B-frames, etc.) from video 300. In some implementations, extract component 104 may extract one or more images from one or more videos at one or more encoded framerates. For example, extract component 104 may extract one or more frames from video 300 at the encoded framerate of 240 frames (images) per second.

In some implementations, extract component 104 may be configured to stabilize one or more images. For example, video 300 may include visual content captured with shaky image sensor(s) and one or more images may be stabilized to compensate for image sensor(s) shake. One or more images may be stabilized based on a feature point detection and/or other information. For example, for individual images, feature points may be tracked and used to determine Euclidean transform matrix that maps between the images. The transforms may form a trajectory that is smoothed and the smoothed result may be applied to the images to form a stabilized result (e.g., reducing differences between a smooth curve and shaky trajectory of parameters (tx, ty, da) that make up rigid 2D transforms between images).

In some implementations, extract component 104 may be configured to downsample one or more images. For example, extract component 104 may downsample one or more images to 128 square resolution, 256 square resolution, 512 square resolution, and/or other resolutions. Images downsampled to different resolutions may be used by different components of system 10. For example, group component 106 may group one or more images into image groups using images downsampled to 128 square resolution. Using images downsampled to 128 square resolution may allow images to be grouped more quickly without compromising accuracy of the grouping. Time lapse image component 118 may determine per pixel flow fields for at least some of the images using images downsampled to 256 square resolution. Using images downsampled to 256 square resolution may allow for faster point computation and interpolation of the pixel flow fields, and allow for more efficient smoothing when the pixel flow fields are applied back to the original resolution images. Uses of other downsampled resolutions are contemplated.

Group component 106 may be configured to group one or more images into image groups. Individual image groups may have individual sizes defined by numbers of images in individual image groups. Individual image groups may include similar and sequential images. For example, a first image group may have a first size defined by the number of images in the first image group. The first image group may include a first image, a second image, and/or other images. The first image may be similar in visual content to the second image and/or other images. The first image may be sequential with the second image and/or other images.

Figure 4:
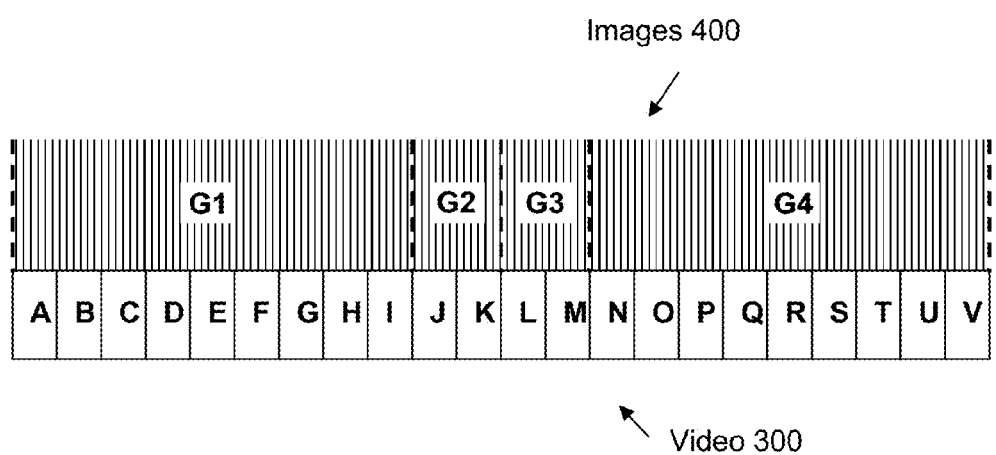
FIG. 4 illustrates an example of images of a video grouped into image groups.

For example, FIG. 4 illustrates an example of images 400 of video 300 grouped into image groups. Images 400 may include images extracted from video 300 by extract component 104. Images 400 may be grouped into separate image groups based on image similarity and/or other information. Images 400 may be grouped into separate image groups G1, G2, G3, G4, and/or other image groups. Image group G1 may include images 400 extracted from video segments A-I. Image group G2 may include images 400 extracted from video segments J-K. Image group G3 may include images 400 extracted from video segments L-M. Image group G4 may include images 400 extracted from video segments N-V. Although images 400 within a single video segment are shown in FIG. 4 as grouped into the same image group (e.g., images 400 in video segment I are all grouped into image group G2, etc.), this is merely for ease of reference and is not limiting. Images 400 within a single video segment may be grouped into separate image groups. For example, some of the images within video segment I may be grouped into image group G1 and some of the images within video segment I may be grouped into image group G2. Other groups of images are contemplated.

In some implementations, grouping one or more images into image groups may include determining image similarity based on comparisons of feature vectors of sequential pairs of the individual images, and/or other information. Feature vectors may include a first feature vector characterizing a local binary pattern distribution of the individual images, a second feature vector characterizing a color distribution of the individual images, and/or other feature vectors. For example, image 400 may include sequential images L1, L2, L3, L4, and/or other images. Feature vectors of sequential pairs of images 400 may be compared such that feature vectors of L1 and L2 are compared, feature vectors of L2 and L3 are compared, feature vectors of L3 and L4 are compared, and so forth. A feature vector comparison may include a function that compares two feature vectors of separate images and returns a Boolean (e.g., one or more thresholds are applied to determine whether the images are "similar" or "not similar"). One or more thresholds used in a feature vector comparison may be set or may be changed. For example, one or more thresholds may be determined based on user input. In some implementations, image similarity may be determined by using systems and/or methods described in U.S. patent application Ser. No. 14/920,375, entitled "SYSTEMS AND METHODS FOR IDENTIFYING A GROUP OF IMAGES," filed Oct. 22, 2015, the foregoing being incorporated herein by reference in its entirety.

Detect component 108 may be configured to detect numbers and types of classified visuals within one or more images. In some implementations, the numbers and the types of classified visuals within one or more images may be detected based on a convolutional neural network based scene and/or object classifier, and/or other information. For example, a convolutional neural network based scene and/or object classifier may be run on individual images and probabilities of detection for each type of classified visuals may be determined.

Classified visuals may refer to one or more visuals of interest. Classified visuals may refer to one or more of a particular object, a particular action, a particular scene, a particular object performing a particular action, a particular object in a particular scene, a particular action in a particular scene, and/or other classified visuals. Classified visuals may be detected within a single image or in multiple images. As a non-limiting example, classified visual may include one or more of a person, a dog, a cat, a sunset, a mountain range, a person performing a flip while skiing, a dog catching a ball, a cat jumping, a person on a mountain peak, a person diving into a pool, and/or other classified visuals. Types of classified visuals may include one or more particular classified visuals. Individual types of classified visuals may correspond to individual classification weights. One or more types of classified visuals may correspond to individual classification weights of same value or different values. For example, a first number of a first type of classified visual within the first image may be detected by detect component 108. The first type of classified visual may correspond to a first classification weight.

Image weight component 110 may be configured to determine one or more image classification weights for one or more images. Image classification weights may characterize the number and the types of classified visuals detected within individual images weighed by classification weights. Image classification weights may be determined based on the numbers and the types of classified visuals detected within the individual images, the individual classification weights, and/or other information. For example, a first image classification weight may be determined for the first image based on the first number of the first type of classified visual and the first classification weight. Image weight component 110 may include and/or retrieve information (e.g., a database, etc.) that matches a detected classified visual to a type of classified visuals and/or an image classification weight.

Interest weight component 112 may be configured to determine interest weights for one or more images. Interest weights may be determined based on the image classification weights for the individual images, the sizes of the image groups to which the individual images belong, and/or other information. For example, a first interest weight may be determined for the first image based on the first image classification weight and the first size. In some implementations, an inverse relationship may exist between interest weights for one or more images and sizes of the image groups to which the individual images belong. This may allow for shorter portions of a video containing similar images (smaller image groups) to be characterized as being more "interesting" than longer portions of a video containing similar images (bigger image groups). For example, two images grouped into separate image groups may have the same value of image classification weights. The separate image groups may have different sizes (i.e., the separate image groups include different numbers of images). Interest weight component 112 may determine an interest weight for one image grouped into a smaller image group to be greater than an interest weight for the other image grouped into a bigger image group.

Interest curve component 114 may be configured to generate an interest curve for one or more images. An interest curve may be generated based on one or more interest weights and/or other information. Values of an interest curve may be determined based on values of interest weights and/or other information. For example, an interest curve may be generated such that a value of the interest curve at a point corresponding to the first image may be based on the first interest weight.

Figure 5:
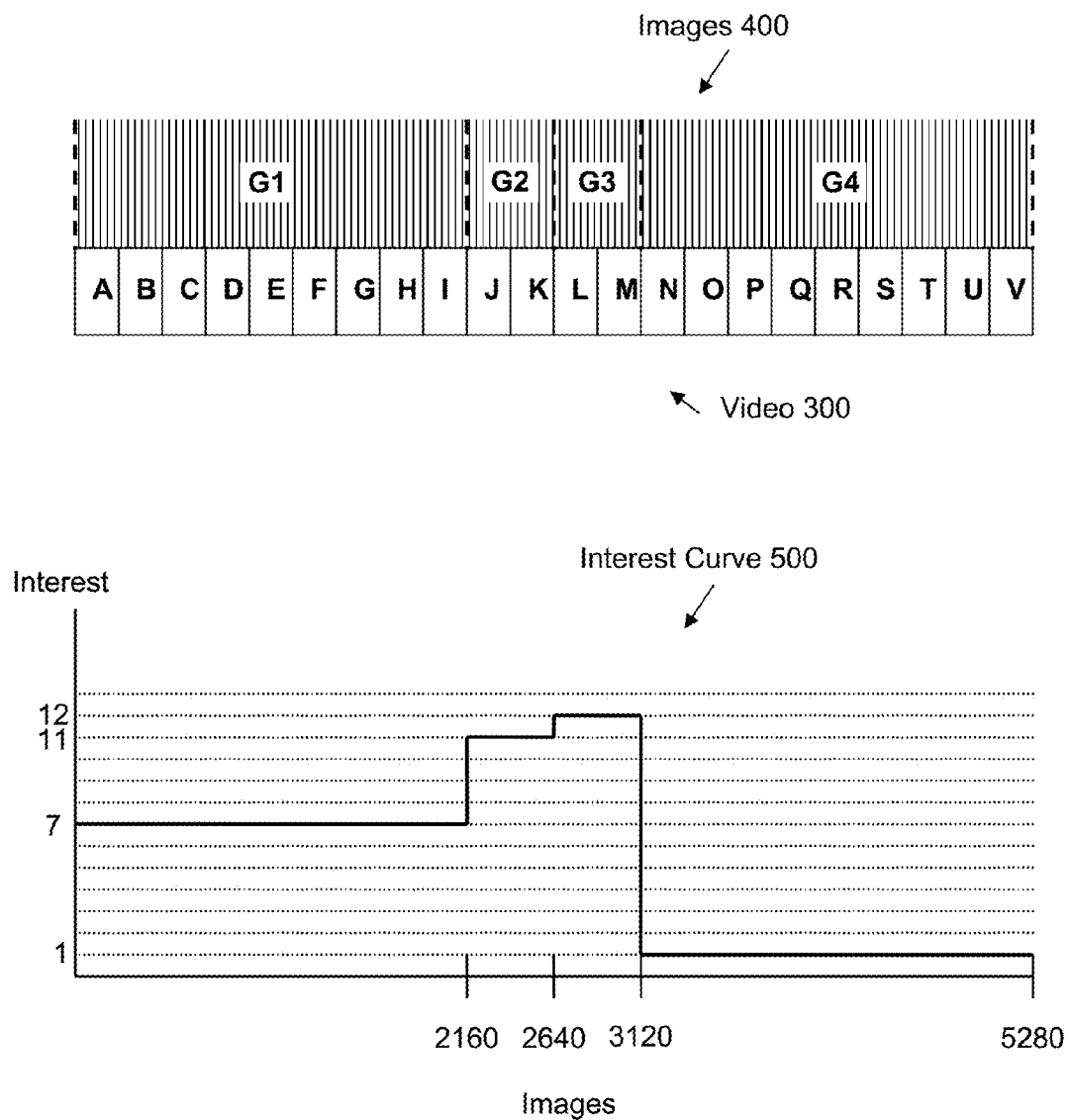
FIG. 5 illustrates an example of an interest curve for images of a video grouped into image groups.

For example, FIG. 5 illustrates exemplary interest curve 500 for images 400 of video 300 grouped into image groups. Values of interest curve 500 may be determined based on values of interest weights for image 400 and/or other information. For example, images 400 may include 5280 images (e.g., 240 images per segment within 22 segments A-V). Images #1-2160 may correspond to an interest value of 7. Images #2161-2640 may correspond to an interest value of 11. Images #2641-3120 may correspond to an interest value of 12. Images #3121-5280 may correspond to an interest value of 1.

Although values of interest curve 500 are shown to not vary within individual image groups, this is merely for ease of reference and is not limiting. For example, one or more images #1-2160 within image group G1 may correspond to same or different values on interest curve 500, one or more images #2160-2640 within image group G2 may correspond to same or different values on interest curve 500, one or more images #2641-3120 within image group G3 may correspond to same or different values on interest curve 500, and/or one or more images #3121-5280 within image group G4 may correspond to same or different values on interest curve 500. Other interest curves are contemplated.

Retime component 116 may be configured to generate a retime curve for one or more images. A retime curve may be generated based on an interest curve and/or other information. Values of a retime curve may be determined based on values of an interest curve and/or other information. A retime curve may define perceived speeds at which a time lapse video is displayed during playback. For example, a retime curve may define a first perceived speed at which a portion of a time lapse video corresponding to the first image is displayed during playback.

A retime curve may allow "interesting" portions of a video to be displayed during playback at a slower perceived speed than "non-interesting" portions of the video. For example, retime curve may allow an "interesting" portion of a video to be display during playback at 1× speed and a "non-interesting" portion of the video to be display during playback at 4× speed. In some implementations, a perceived speed defined by a retime curve may be based on one or more types of classified visuals detected within images. For example, a person may correspond to a perceived speed of 1× and a person performing a flip while skiing may correspond to a perceived speed of 0.5×. A retime curve may include value corresponding to the slowest speed for multiple types of classified visuals detected within an image. This may allow the most "interesting" type of classified visual to determine the perceived speed with which an image may be displayed. For example, an image may contain a dog (corresponding to a perceived speed of 2×) and a cat (corresponding to a perceived speed of 1×). The value of a retime curve for this image may be 1×.

Figure 6:
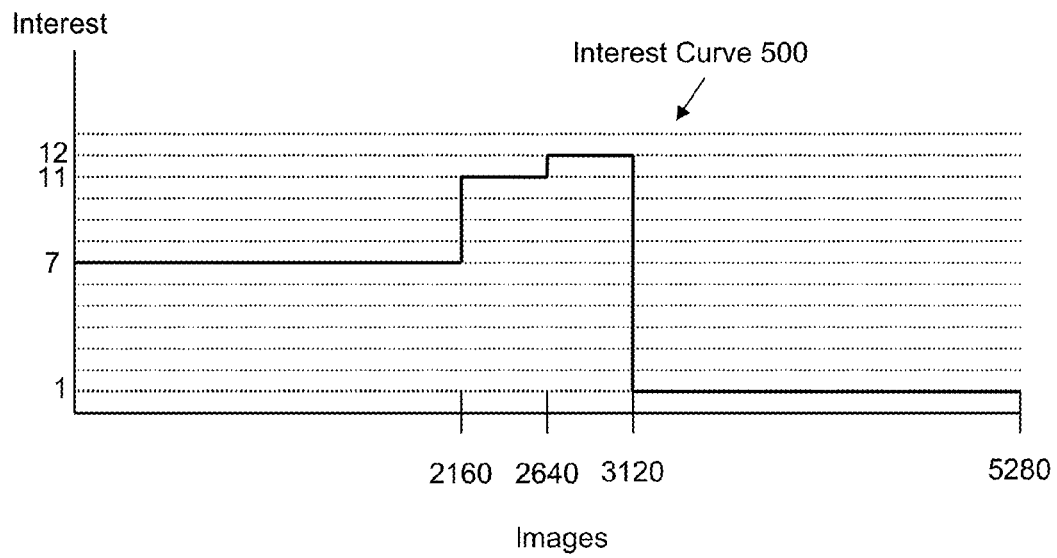
FIG. 6 illustrates an example of a retime curve based on an interest curve.
Figure 6:
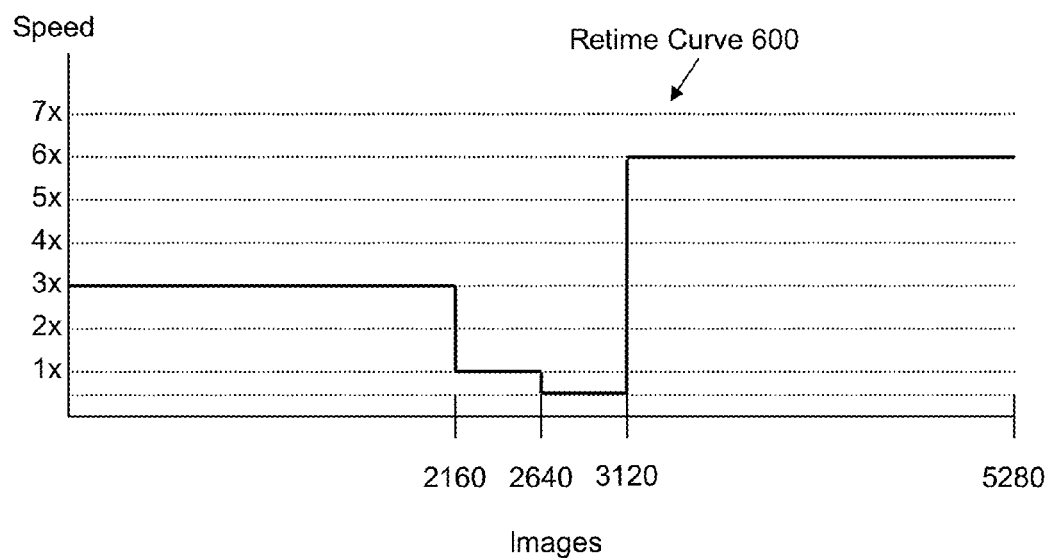

FIG. 6 illustrates an exemplary retime curve 600. Retime curve 600 may be based on interest curve 500. Values of retime curve 600 may be determined based on values of interest curve 500 and/or other information. For example, images #1-2160 may correspond to a perceived speed of 3× based on an interest value of 7. Images #2161-2640 may correspond to a perceived speed of 1× based on an interest value of 11. Images #2641-3120 may correspond to a perceived speed of 0.5× based on an interest value of 12.

Images #3121-5280 may correspond to a perceived speed of 6× based on an interest value of 1.

Although values of retime curve 600 are shown to not vary within individual image groups, this is merely for ease of reference and is not limiting. For example, one or more images #1-2160 (within image group G1) may correspond to same or different values on retime curve 600, one or more images #2160-2640 (within image group G2) may correspond to same or different values on retime curve 600, one or more images #2641-3120 (within image group G3) may correspond to same or different values on retime curve 600, and/or one or more images #3121-5280 (within image group G4) may correspond to same or different values on retime curve 600. One or more portions of retime curve 600 may be rounded to avoid sharp changes between perceived speeds. For example, retime curve 600 around image #3120 may be rounded so that the perceived speeds of images changes smoothly from 1× to 6×, rather than jumping from 1× to 6×. Other retime curves are contemplated.

Time lapse image component 118 may be configured to determine one or more time lapse images to be included in a time lapse video. One or more time lapse images may be determined based on one or more images, a retime curve, and/or other information. For example, time lapse image component 118 may select one or more images (which may have been stabilized by extract component 104) to be included as time lapse image based on a retime curve and a framerate of a time lapse video. This may allow rendering of a new set of images capturing timings based on the retime curve.

Figure 7:
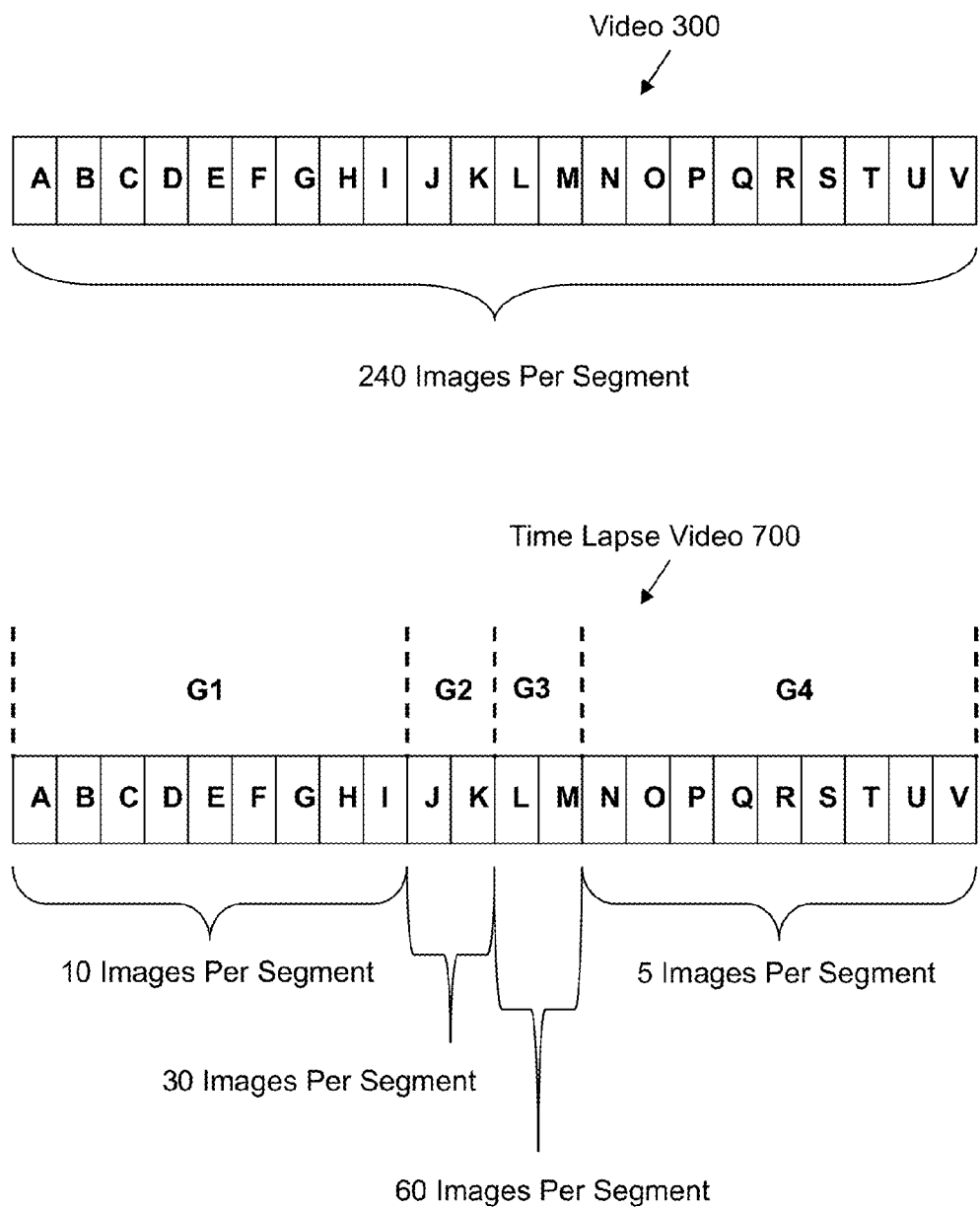
FIG. 7 illustrates examples of images per second for video segments within a video and a time lapse video.

FIG. 7 illustrates examples of images per second for video segments within video 300 and time lapse video 700. Time lapse image component 118 may determine one or more time lapse images to be included in time lapse video 700 from images extracted from video 300. The number of images selected from different portions of video 300 may depend on retime curve 600. For example, time lapse video 700 may be encoded with a framerate of 30 frames (images) per second (i.e., playing time lapse video 700 may display 30 images per second). To encode time lapse video 700 with the framerate of 30 frames per second based on retime curve 500, time lapse image component 118 may select different numbers of images from different image groups G1-G4.

For example, images from individual video segments A-I (within image group G1, which corresponds to 3× speed in retime curve 600) may be selected at 10 images per second. This may result in individual video segments A-I having individual play durations of ⅓ second (10 images divided by 30 frames per second). Images from individual video segments J-K (within image group G2, which corresponds to 1× speed in retime curve 600) may be selected at 30 images per second. This may result in individual video segments J-K having individual play durations of 1 second. Images from individual video segments L-M (within image group G3, which corresponds to 0.5× speed in retime curve 600) may be selected at 60 images per second. This may result in individual video segments L-M having individual play durations of 2 seconds. Images from individual video segments N-V (within image group G4, which corresponds to 6× speed in retime curve 600) may be selected at 5 images per second. This may result in individual video segments N-V having individual play durations of ⅙ second.

Figure 8:
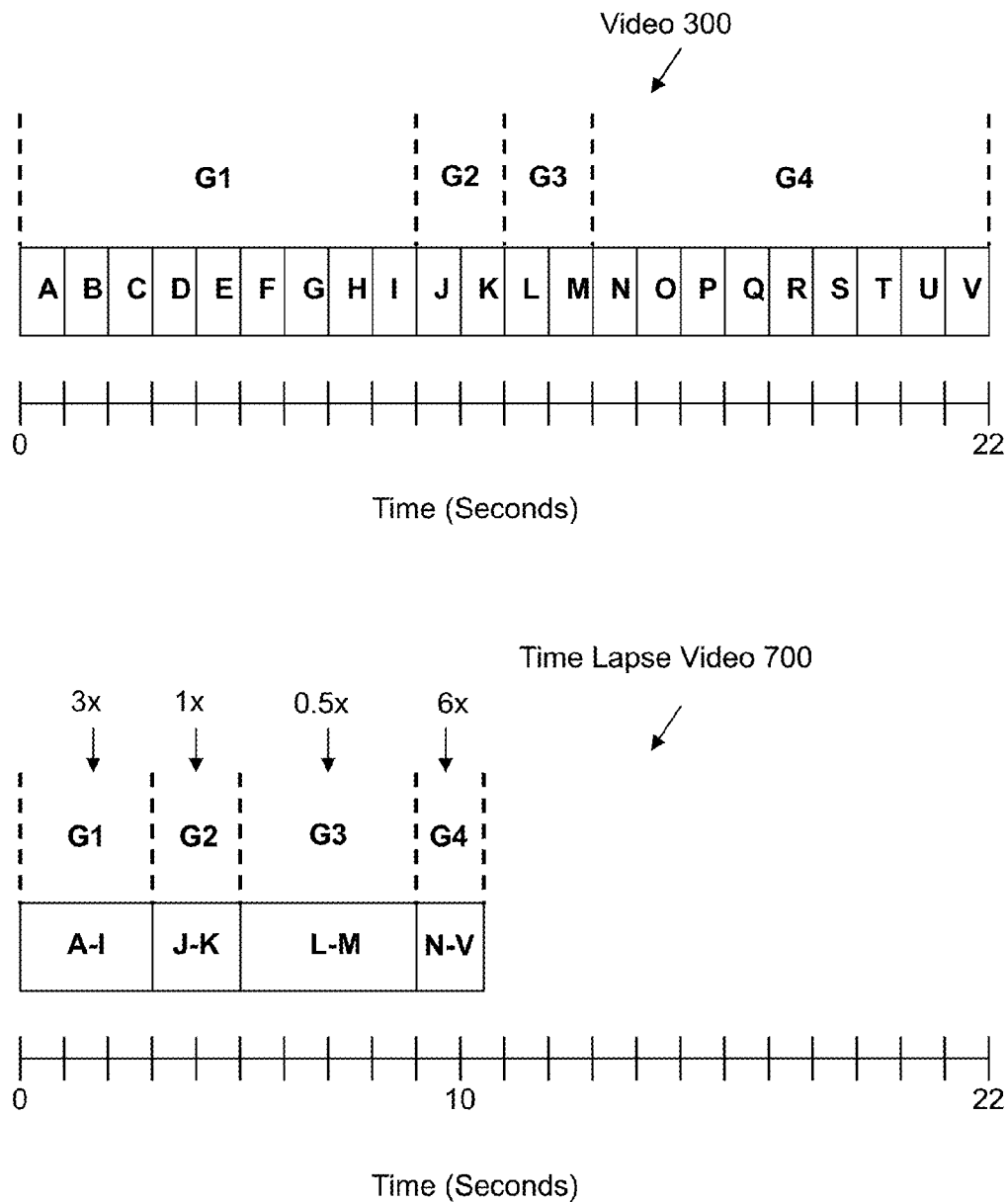
FIG. 8 illustrates examples of lengths of video segments within a video and a time lapse video.

FIG. 8 illustrates examples of lengths of video segments within video 300 and time lapse video 700. As explained above, video segments A-V in video 300 may represent one-second capture of video 300 at encoded framerate of 240 frames per second. With 22 video segments (A-V), video 300 may have a time duration of 22 seconds. Based on the determination of time lapse images to be included in time lapse video 700, time lapse video 700 may have a time duration of 10.5 seconds. Video segments A-I (9-second capture of video 300) may have a 3-second duration in video 700. Video segments J-K (2-second capture of video 300) may have a 2-second duration in video 700. Video segments L-M (2-second capture of video 300) may have a 4-second duration in video 700. Video segments N-V (9-second capture of video 300) may have a 1.5-second duration in video 700.

Figure 9:
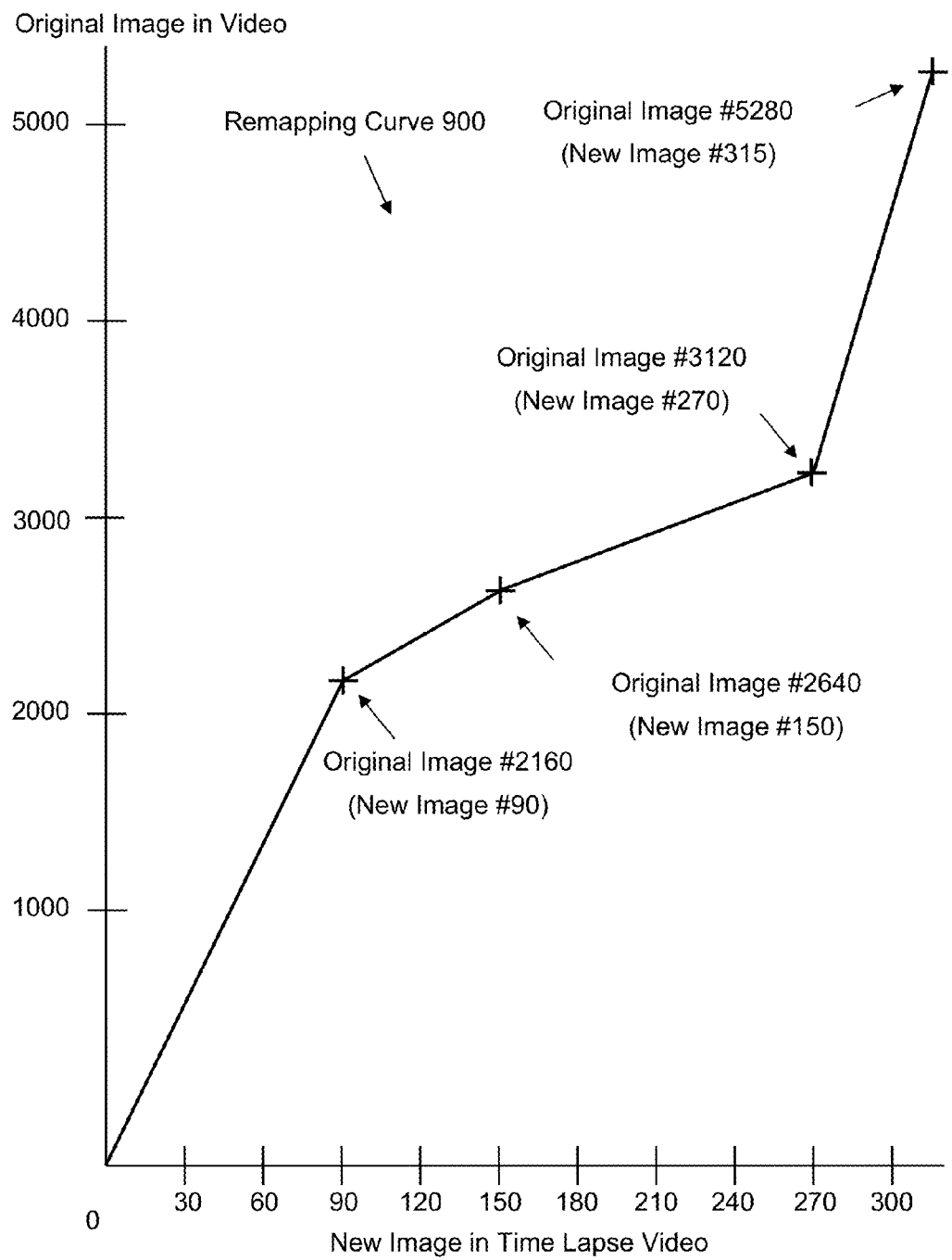
FIG. 9 illustrates an example of a remapping curve based on the retime curve shown in FIG. 6.

FIG. 9 illustrates an exemplary remapping curve 900 based on retime curve 600 (shown in FIG. 6). Remapping curve 900 may illustrate changes in image positions between video 300 and time lapse video 700. Remapping curve 900 may display where one or more original images within video 300 may appear within time lapse video 700. For example, based on retime curve 600, remapping curve 900 may show that original image #2160 (last image in image group G1) may appear as image #90 in time lapse video 700 (at 3 second mark in time lapse video 700). Remapping curve 900 may show that original image #2640 (last image in image group G2) may appear as image #150 in time lapse video 700 (at 5 second mark in time lapse video 700). Remapping curve 900 may show that original image #3120 (last image in image group G3) may appear as image #270 in time lapse video 700 (at 9 second mark in time lapse video 700). Remapping curve 900 may show that original image #5280 (last image in image group G4) may appear as image #315 in time lapse video 700 (at 10.5 second mark in time lapse video 700).

Figure 10A:
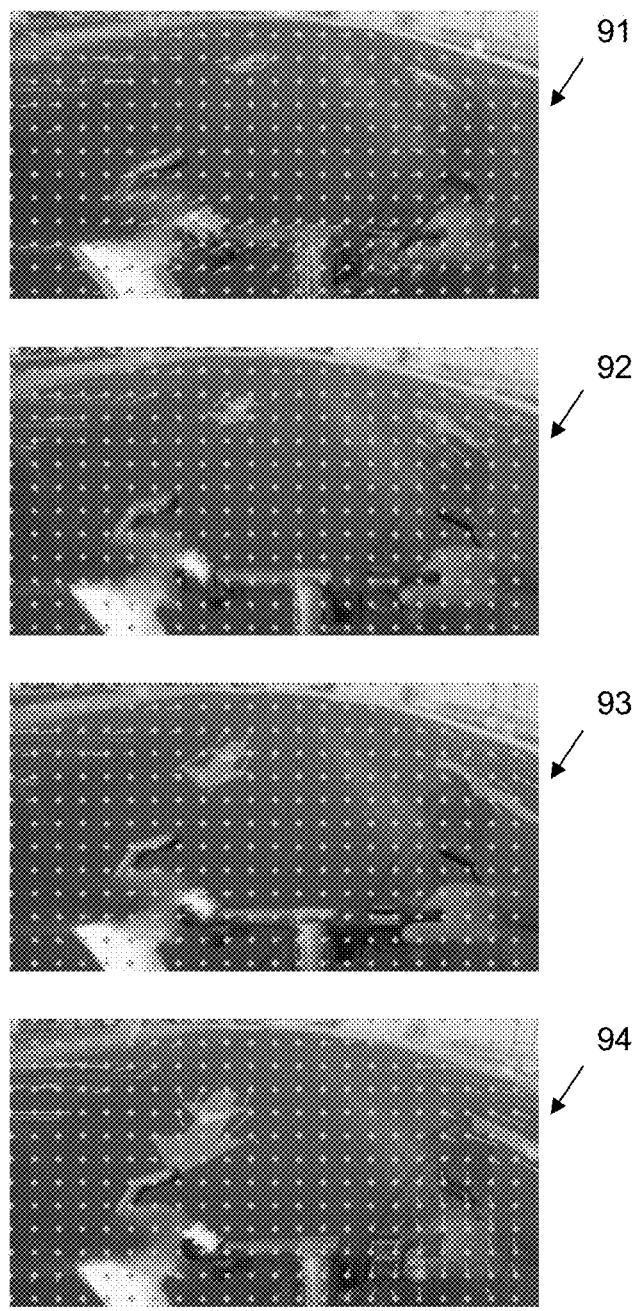
FIG. 10A illustrates examples per pixel flow fields within downsampled images.
Figure 10B:
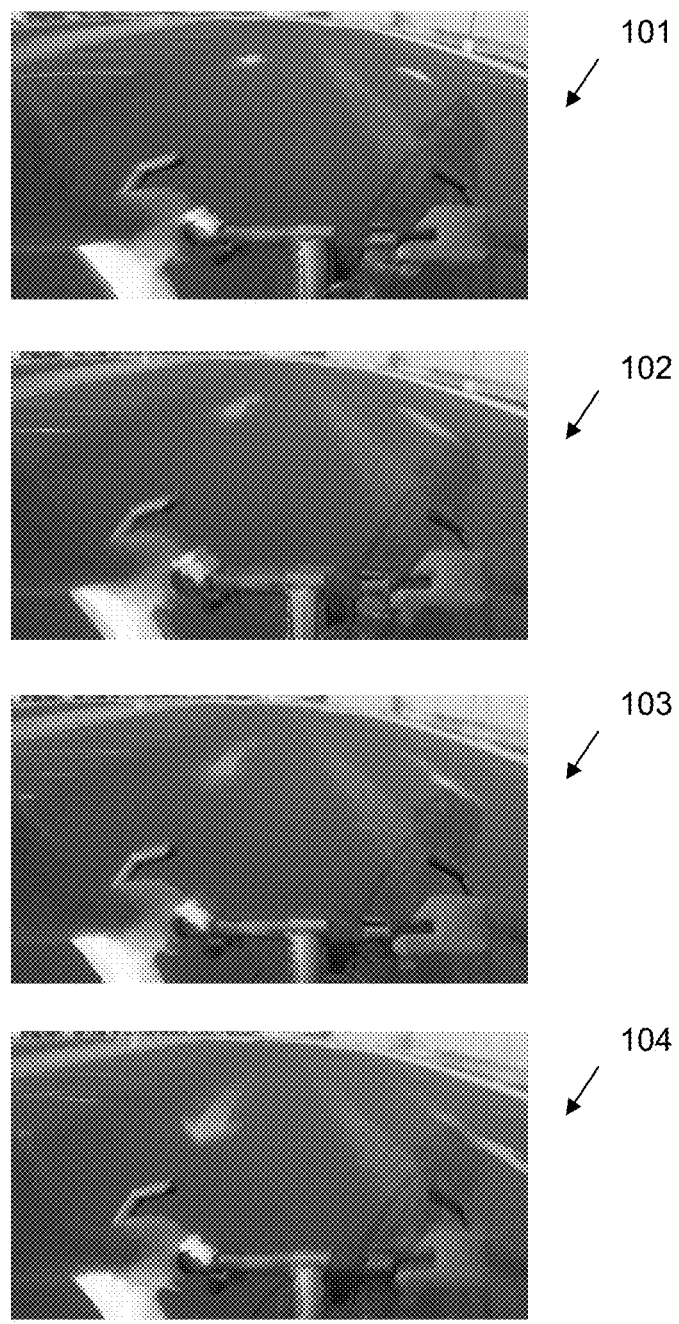
FIG. 10B illustrates examples of images including motion blur based on per pixel flow fields shown in FIG. 10A.

In some implementations, determining one or more time lapse images to be included in a time lapse video may include modifying at least some of the images to include motion blur based on the interest curve and/or other information. Modifying at least some of the images to include motion blur may include determining per pixel flow fields for at least some of the images and applying a line integral convolution based on the per pixel flow fields and/or other information. For example, the interest curve may be used as a mask to selectively apply a dense optical flow algorithm to individual images within image groups determined to be "non-interesting," outputting per pixel flow fields. When time lapse images are determined, the per pixel flow fields may be used as input to a line integral convolution to create streaks of motion blur within the time lapse images. Streaks of motion blur may emphasize speed up effects within the time lapse images. For example, FIG. 10A illustrates exemplary per pixel flow fields within downsampled images 91-94, and FIG. 10B illustrates exemplary modified images 101-104 including motion blur based on per pixel flow fields shown in FIG. 10A.

Time lapse video component 120 may be configured to generate one or more time lapse videos. One or more time lapse video may be generated based on one or more time lapse images and/or other information. For example, time lapse video component 120 may encode the time lapse images into a new video file. The time lapse images may be encoded using one or more encoding framerates (e.g., 30 frames per second, variable framerate, etc.)

While the present disclosure may be directed to videos, one or more other implementations of the system may be configured for other types media content. Other types of media content may include one or more of audio content (e.g., music, podcasts, audio books, and/or other audio content), multimedia presentations, photos, slideshows, and/or other media content.

Although processor 11 and electronic storage 12 are shown to be connected to an interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, 112, 114, 116, 118, and/or 120 may be eliminated, and some or all of its functionality may be provided by other computer program components. As another example, processor 11 may be configured to execute one or more additional computer program components that may perform some or all of the functionality attributed to one or more of computer program components 102, 104, 106, 108, 110, 112, 114, 116, 118, and/or 120 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
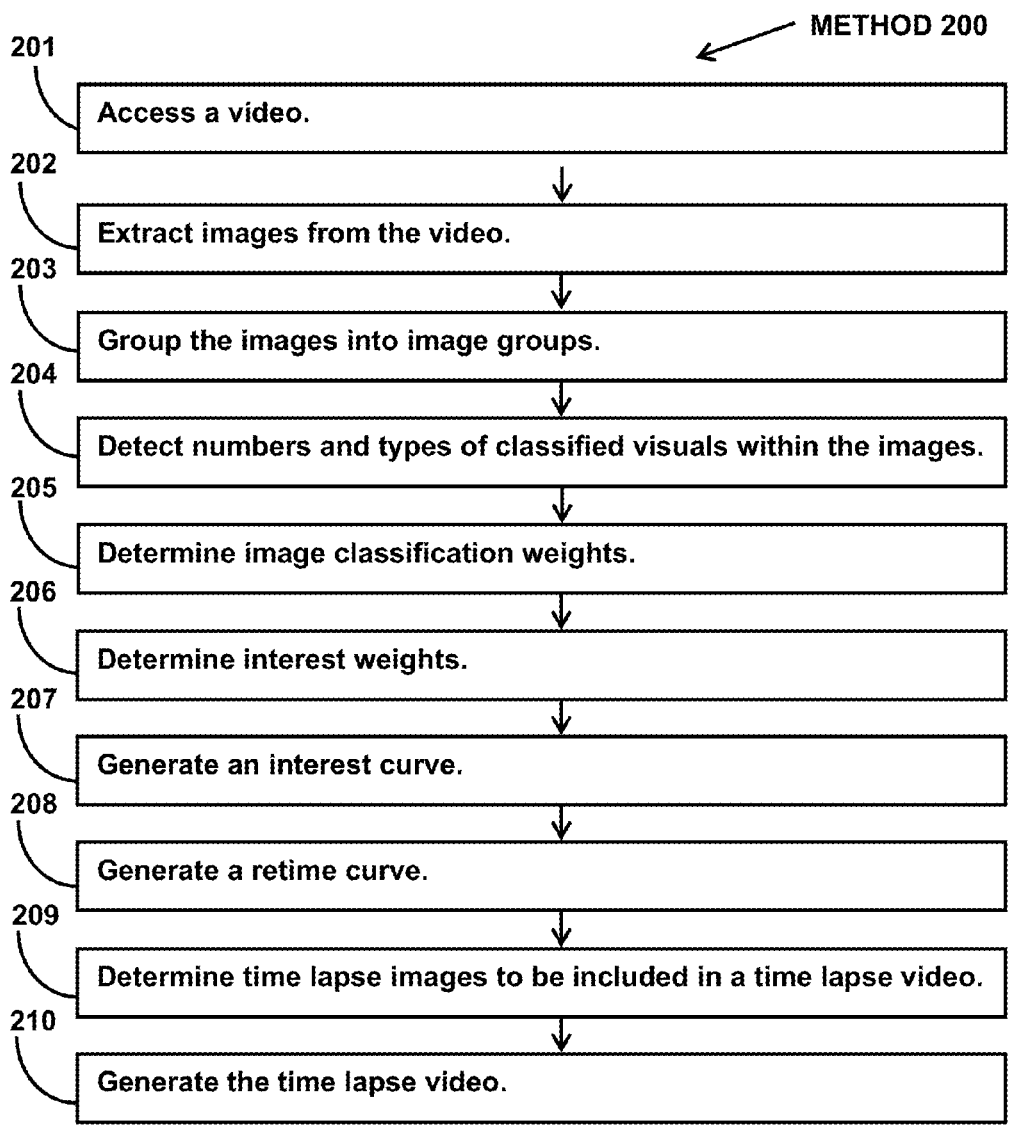
FIG. 2 illustrates a method for generating a time lapse video.

FIG. 2 illustrates method 200 for generating a time lapse video. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a video may be accessed. A video may be accessed from electronic storage and/or from other locations. In some implementations, operation 201 may be performed by a processor component the same as or similar to access component 102 (shown in FIG. 1 and described herein).

At operation 202, images may be extracted from the video. The video may be characterized by one or more encoded framerates. The images may be extracted from the video at one or more encoded framerates. In some implementations, operation 202 may be performed by a processor component the same as or similar to extract component 104 (shown in FIG. 1 and described herein).

At operation 203, images may be grouped into image groups. Individual image groups may have individual sizes defined by numbers of images in the individual image groups. Individual image groups may include similar and sequential images. In some implementations, operation 203 may be performed by a processor component the same as or similar to group component 106 (shown in FIG. 1 and described herein).

At operation 204, numbers and types of classified visuals within the images may be detected. Individual types of classified visuals may correspond to individual classification weights. In some implementations, operation 204 may be performed by a processor component the same as or similar to detect component 108 (shown in FIG. 1 and described herein).

At operation 205, image classification weights may be determined. Image classification weights may be determined based on the numbers and the types of classified visuals detected within the individual images, the individual classification weights, and/or other information. In some implementations, operation 205 may be performed by a processor component the same as or similar to image weight component 110 (shown in FIG. 1 and described herein).

At operation 206, interest weights may be determined. Interest weights may be determined based on the image classification weights for the individual images, the sizes of the image groups to which the individual images belong, and/or other information. In some implementations, operation 206 may be performed by a processor component the same as or similar to interest weight component 112 (shown in FIG. 1 and described herein).

At operation 207, an interest curve may be generated. An interest curve may be generated based on one or more interest weights and/or other information. In some implementations, operation 207 may be performed by a processor component the same as or similar to interest curve component 114 (shown in FIG. 1 and described herein).

At operation 208, a retime curve may be generated. A retime curve may be generated based on an interest curve and/or other information. A retime curve may define perceived speeds at which a time lapse video is displayed during playback. In some implementations, operation 208 may be performed by a processor component the same as or similar to retime curve component 116 (shown in FIG. 1 and described herein).

At operation 209, time lapse images to be included in a time lapse video may be determined. Time lapse images may be determined based on one or more images, a retime curve, and/or other information. In some implementations, operation 209 may be performed by a processor component the same as or similar to time lapse image component 118 (shown in FIG. 1 and described herein).

At operation 210, the time lapse video may be generated. The time lapse video may be generated based on one or more time lapse images, and/or other information. In some implementations, operation 210 may be performed by a processor component the same as or similar to time lapse video component 120 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating a time lapse video, the system comprising: one or more physical processors configured by machine readable instructions to:
    access a video;
    extract images from the video;
    group the images into image groups, individual image groups having individual sizes defined by numbers of the images in the individual image groups and including similar and sequential images such that a first image group having a first size includes a first image and a second image, the first image similar to the second image and sequential with the second image;
    detect numbers and types of classified visuals within the images, individual types of classified visuals corresponding to individual classification weights, such that a first number of a first type of classified visual within the first image is detected, the first type of classified visual corresponding to a first classification weight;
    determine image classification weights for the images based on the numbers and the types of classified visuals detected within the individual images and the individual classification weights such that a first image classification weight is determined for the first image based on the first number of the first type of classified visual and the first classification weight;
    determine interest weights for the images based on the image classification weights for the individual images and the sizes of the image groups to which the individual images belong, such that a first interest weight is determined for the first image based on the first image classification weight and the first size;
    generate an interest curve for the images based on the interest weights such that a value of the interest curve at a point corresponding to the first image is based on the first interest weight;
    generate a retime curve for the images based on the interest curve, the retime curve defining perceived speeds at which the time lapse video is displayed during playback such that the retime curve defines a first perceived speed at which a portion of the time lapse video corresponding to the first image is displayed during playback;
    determine time lapse images to be included in the time lapse video based on the images and the retime curve; and
    generate the time lapse video based on the time lapse images.

2. The system of claim 1, wherein the video is characterized by an encoded framerate and the images are extracted from the video at the encoded framerate.

3. The system of claim 1, wherein the one or more physical processors are further configured by machine readable instructions to downsample the images.

4. The system of claim 1, wherein the one or more physical processors are further configured by machine readable instructions to stabilize the images based on a feature point detection.

5. The system of claim 1, wherein grouping the images into the image groups includes determining image similarity based on comparisons of feature vectors of sequential pairs of the individual images, the feature vectors including a first feature vector characterizing a local binary pattern distribution of the individual images and a second feature vector characterizing a color distribution of the individual images.

6. The system of claim 1, wherein the numbers and the types of classified visuals within the images are detected based on a convolutional neural network based scene and/or object classifier.

7. The system of claim 1, wherein an inverse relationship exists between the interest weights for the images and the sizes of the image groups to which the individual images belong.

8. A method for generating a time lapse video, the method performed by a computing system including one or more physical processors, the method comprising:
    accessing, by the computing system, a video;
    extracting, by the computing system, images from the video;
    grouping, by the computing system, the images into image groups, individual image groups having individual sizes defined by numbers of the images in the individual image groups and including similar and sequential images such that a first image group having a first size includes a first image and a second image, the first image similar to the second image and sequential with the second image;
    detecting, by the computing system, numbers and types of classified visuals within the images, individual types of classified visuals corresponding to individual classification weights, such that a first number of a first type of classified visual within the first image is detected, the first type of classified visual corresponding to a first classification weight;

determining, by the computing system, image classification weights for the images based on the numbers and the types of classified visuals detected within the individual images and the individual classification weights such that a first image classification weight is determined for the first image based on the first number of the first type of classified visual and the first classification weight;

determining, by the computing system, interest weights for the images based on the image classification weights for the individual images and the sizes of the image groups to which the individual images belong, such that a first interest weight is determined for the first image based on the first image classification weight and the first size;

generating, by the computing system, an interest curve for the images based on the interest weights such that a value of the interest curve at a point corresponding to the first image is based on the first interest weight;

generating, by the computing system, a retime curve for the images based on the interest curve, the retime curve defining perceived speeds at which the time lapse video is displayed during playback such that the retime curve defines a first perceived speed at which a portion of the time lapse video corresponding to the first image is displayed during playback;

determining, by the computing system, time lapse images to be included in the time lapse video based on the images and the retime curve; and generating, by the computing system, the time lapse video based on the time lapse images.

9. The method of claim 8, wherein the video is characterized by an encoded framerate and the images are extracted from the video at the encoded framerate.

10. The method of claim 8, further comprising downsampling, by the computing system, the images.

11. The method of claim 8, further comprising stabilizing, by the computing system, the images based on a feature point detection.

12. The method of claim 8, wherein grouping the images into the image groups includes determining image similarity based on comparisons of feature vectors of sequential pairs of the individual images, the feature vectors including a first feature vector characterizing a local binary pattern distribution of the individual images and a second feature vector characterizing a color distribution of the individual images.

13. The method of claim 8, wherein the numbers and the types of classified visuals within the images are detected based on a convolutional neural network based scene and/or object classifier.

14. The method of claim 8, wherein an inverse relationship exists between the interest weights for the images and the sizes of the image groups to which the individual images belong.

15. A system for generating a time lapse video, the system comprising: one or more physical processors configured by machine readable instructions to:

access a video, the video characterized by an encoded framerate;

extract images from the video at the encoded framerate;

downsample the images;

stabilize the images based on a feature point detection;

group the images into image groups, individual image groups having individual sizes defined by numbers of the images in the individual image groups and including similar and sequential images such that a first image group having a first size includes a first image and a second image, the first image similar to the second image and sequential with the second image;

detect numbers and types of classified visuals within the images, individual types of classified visuals corresponding to individual classification weights, such that a first number of a first type of classified visual within the first image is detected, the first type of classified visual corresponding to a first classification weight;

determine image classification weights for the images based on the numbers and the types of classified visuals detected within the individual images and the individual classification weights such that a first image classification weight is determined for the first image based on the first number of the first type of classified visual and the first classification weight;

determine interest weights for the images based on the image classification weights for the individual images and the sizes of the image groups to which the individual images belong, such that a first interest weight is determined for the first image based on the first image classification weight and the first size;

generate an interest curve for the images based on the interest weights such that a value of the interest curve at a point corresponding to the first image is based on the first interest weight;

generate a retime curve for the images based on the interest curve, the retime curve defining perceived speeds at which the time lapse video is displayed during playback such that the retime curve defines a first perceived speed at which a portion of the time lapse video corresponding to the first image is displayed during playback;

determine time lapse images to be included in the time lapse video based on the images and the retime curve, determining the time lapse images to be included in the time lapse video including modifying at least some of the images to include motion blur based on the interest curve; and generate the time lapse video based on the time lapse images.

16. The system of claim 15, wherein:

grouping the images into the image groups includes determining image similarity based on comparisons of feature vectors of sequential pairs of the individual images, the feature vectors including a first feature vector characterizing a local binary pattern distribution of the individual images and a second feature vector characterizing a color distribution of the individual images; and the numbers and the types of classified visuals within the images are detected based on a convolutional neural network based scene and/or object classifier.

* * * * *